(No Model.)
S. EASTMAN.
EYEGLASSES.
No. 511,598. Patented Dec. 26, 1893.
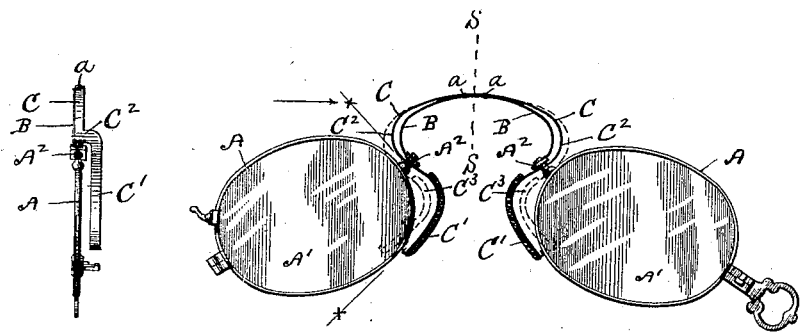
Fig. 2.   Fig. 1.
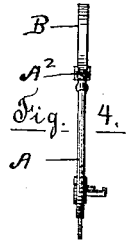 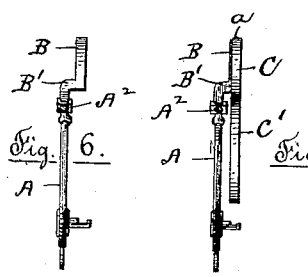 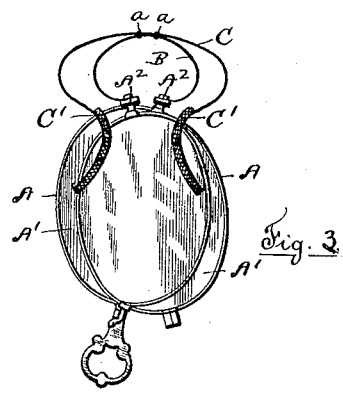
Fig. 4.   Fig. 6.   Fig. 5.   Fig. 3.
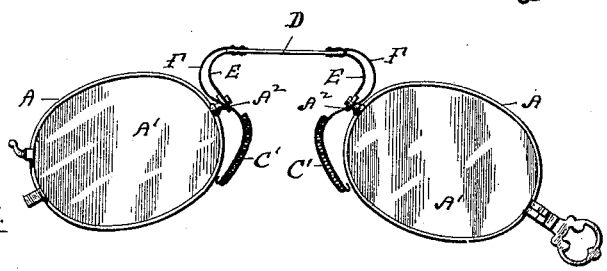
Fig. 7.
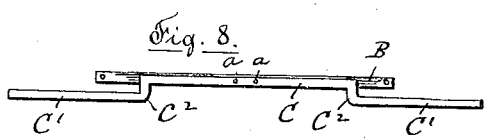
Witnesses
Chas. F. Schmelz,
H. M. Fowler
Inventor
Sylvester Eastman,
By his Attorney
Rufus S. Fowler

UNITED STATES PATENT OFFICE.

SYLVESTER EASTMAN, OF PROVIDENCE, RHODE ISLAND, ASSIGNOR, BY DIRECT AND MESNE ASSIGNMENTS, TO RUFUS B. FOWLER AND OSCAR C. C. ADAMS, OF WORCESTER, MASSACHUSETTS.

EYEGLASSES.

SPECIFICATION forming part of Letters Patent No. 511,598, dated December 26, 1893.

Application filed March 16, 1889. Serial No. 303,518. (No model.)

*To all whom it may concern:*

Be it known that I, SYLVESTER EASTMAN, a citizen of the United States, and a resident of Providence, in the county of Providence and State of Rhode Island, have invented a new and useful Improvement in Eyeglasses, of which the following is a specification, reference being had to the accompanying drawings, forming a part of the same, and in which—

Figure 1 is a front view of a pair of eyeglasses embodying my invention. Fig. 2 is a sectional view on line X, X, Fig. 1, looking in the direction of the arrow 1, Fig. 1, the frame of one of the lenses having been removed. Fig. 3 is a view of the eyeglasses with the lenses folded together. Fig. 4 represents a sectional view on line X, X, Fig. 1 and with the spring to which the nose-guards are attached removed in order to show the form of the bow spring which connects the eye-wires. Fig. 5 is a sectional view on line X, X, Fig. 1, but showing a modified form of the bow spring. Fig. 6 is a similar section with the modified form of bow spring and with the nose-guard spring removed. Fig. 7 represents a front view of a pair of eyeglasses, having a rigid bar interposed between the springs, but deemed to fall within the scope of my present invention. Fig. 8 is a view of the springs as used in the eyeglasses represented in Fig. 1, shown as extended, and Fig. 9 is a view of the springs and interposed rigid bar, which are represented in Fig. 7, shown as being extended.

Similar letters refer to similar parts in the different views.

The object of my invention is to prevent the displacement of the lenses when supported upon the nose and to thereby enable the wearer to maintain them in a position of proper adjustment with the optic axes, so that the rays from the object of vision, in passing through the lenses and the refractive media of the eyes, shall be focussed upon corresponding points and within the sensitive area of the retinæ, and, in cases of astigmatism, within the planes of uniform focal length, and also to enable the nose-guards to be separated by the separation of the lenses in the same manner as is now done in eyeglasses of ordinary construction. This latter object is accomplished by placing the nose-guard spring outside the bow-spring, so that when the lenses are separated and the bow-spring straightened, it will carry the nose-guard spring with it and cause the separation of the nose-guards and at the same time allow the nose-guards to be separated independently of the separation of the lenses.

The essential feature of my invention so far as it is concerned in the attainment of the first of these objects, consists in the employment of a spring whose tension is applied to press the nose-guards against the sides of the nose, the strain upon said spring being independent of the eye-wires, so that the lenses are not moved as the distance between the nose-guards is varied. This result is accomplished in my improved eyeglasses by attaching the nose-guard spring to the bow-spring so that the axes of flexure of the two springs shall coincide.

In the accompanying drawings, A A denote the eye-wires inclosing the lenses A' A', and having the lugs $A^2$ $A^2$, to which the ends of the bow spring B are attached, forming the frame of the eyeglasses.

C denotes the nose-guard spring attached at its central section by screws, or rivets $a$ $a$ to the central section of the bow spring B.

C' C' are the nose guards placed upon or attached to the free ends of the nose-guard spring C and properly inclined to each other to adapt to the sides of the nose.

In Figs. 2, 4, 5 and 6, are shown sectional views by cutting through one of the lugs $A^2$, on the line X X, Fig. 1 and removing one of the eye-wires A in order to show more clearly the form of the bow and nose-guard springs as employed in the form of eyeglasses shown in Fig. 1 of the drawings. In Fig. 4 the nose-guard spring has been removed to disclose the bow spring B, which is preferably made of a steel band suitably curved and attached at its ends to the lugs $A^2$ $A^2$, but lying in the same plane as the eye-wires A, A, as seen in Fig. 4.

The eye-wires and bow spring form a frame similar in its construction to the ordinary eyeglasses now in common use. Instead, however, of attaching the nose-guards to the eye-wires, or to the lugs $A^2 A^2$, or to the bow spring at or near its ends either directly or by intermediate nose-guard springs, as it is now customary to do, I attach them to the free ends of a spring C, which is placed upon the outer side and coincident with the bow spring and attached thereto at $a\ a$.

The nose-guard spring is offset at $C^2 C^2$ in order to bring the nose-guards into a different plane from the lenses and inside the frame as the eyeglasses are worn. In separating the lenses for the purpose of applying the eyeglasses to the nose the bow spring will be partially straightened and as the nose-guard spring lies upon and outside of the bow spring between the offset sections $C^2 C^2$ it is evident that the nose-guard spring will also be partially straightened and the nose-guards separated allowing them to be applied to the nose.

When the eyeglasses have been placed upon the nose and the eye-wires released the tension of the bow spring will return the lenses to their normal position as shown in Fig. 1, while the nose-guards $C'\ C'$ being slightly separated by the bridge of the nose, will cause the nose-guard spring to assume the broken lines $C^3 C^3$, Fig. 1.

It will be obvious that when the lenses are separated or brought together the axis of flexure of the bow spring B will pass through the center of the spring as indicated by the broken line S S, the central portion of the spring forming a neutral section. Similarly when the nose-guards are separated or brought together the center of the nose-guard spring forms a neutral section and if the two springs be attached so that the axis of flexure of one shall correspond with the axis of flexure of the other, as at S S, Fig. 1, then the outward motion of the outer spring, or spring C, and the inward motion of the inner spring, or spring B, will be independent of any strain upon its connected spring. The tension of the bow spring B will, therefore, cause the lenses to maintain their normal position entirely independent of the distance apart of the nose-guards $C'\ C'$. Likewise the folding of the eye-wires together in the position shown in Fig. 3, will not affect the position of the nose-guards $C'\ C'$.

In order to completely secure the independent action of the bow and nose-guard springs as described, the point of attachment should, theoretically be made to coincide with the axes of flexure S S, but practically it has been found sufficient to attach the bow spring B and nose-guard spring C together at the two points $a\ a$ near and upon opposite sides of the axes of flexure of the two springs.

By the above described construction the nose-guards are separated by the separation of the eye-wires in the operation of applying the eyeglasses to the nose, and when the eye-wires are once released the tension of the bow spring will restore the lenses to their normal position, with reference to the optic axes, thereby securing a distinct retinal impression, without the exertion and consequent fatigue of the accommodative apparatus of the eye.

In the flattened, or extended position of the springs B and C as shown in Fig. 8, the bow spring B consists of a straight steel band, and the nose-guard spring C of a similar steel band having the offsets $C^2 C^2$, the section between $C^2$, $C^2$ coinciding with the bow spring B and the sections forming the free ends of the nose-guard spring supporting the nose-guards $C'\ C'$. While I deem this form of the springs the preferable construction, I do not confine myself to it as the bow spring itself can be offset at $B'$, as illustrated in Fig. 6, and the nose-guard spring be made in the form shown in Fig. 5, with the same result.

The bow spring shown in Fig. 1 consists of an elastic band of uniform flexibility throughout its entire length and consequently possesses a single axis of flexure corresponding with the broken line S S, the ends attached to the lugs $A^2 A^2$, acting in reality as two separate and independent springs about the axis S S. If the central section of the bow spring were thickened to form a rigid section, the axes of flexure would fall at the sides of the rigid section and in that case the nose-guard spring might be attached at points at each side of the rigid section of the bow spring, as illustrated in Figs. 7 and 9, in which D denotes a rigid bar to whose ends are attached the ends of the springs E E, with their opposite ends attached to the lugs $A^2 A^2$ of the eye-wires A A. To the outer side of the rigid bar D I attach the ends of the springs F F and upon the free ends of the springs F F I place the nose-guards $C'\ C'$. In this form of construction the rigid bar D becomes a component part of the frame of the eyeglasses and the bow springs E E, and nose-guard springs F F, are attached thereto, but as in the construction shown in Fig. 1 the axes of flexure of both bow spring and nose-guard springs are made to coincide, so that the outward movement of the nose-guard spring as the eye glasses are placed upon the nose and the inward movement of the bow springs as they act to return the lenses to their normal position in proper adjustment with the eye, are alike independent of each other. I therefore deem both constructions, substantially similar in so far as they embody the essential feature of this portion of my invention. The pivoted ends of the nose-guard springs F F, are made to overlap and coincide with the bow springs E E, so that the separation of the lenses will cause a separation of the nose-guards, in applying the eyeglasses to the nose, the nose-guard springs F F being offset at $F' F'$, as shown in Fig. 9 in which the rigid bar D and its attached springs are shown with the springs in a flattened or extended position.

I am aware that elastic nose-guards attached to the bow spring of eyeglasses have been known heretofore. Such I do not herein claim broadly.

I am also aware that the nose-guard springs have been attached to the eye-wires extended over the bow-spring and returning in parallel lines to their point of attachment to said eye-wires, and having nose-guards attached to their free ends, such a construction having been shown in the patent to Currin, No. 425,595. By the method of attachment therein described the angle of the eye-wires relatively to each other is changed, whenever the lenses are folded together, by bending the bow-spring, and as the nose-guards are attached to the eye-wires instead of the bow-spring, the bent, or central, sections of the eye-wires will be made to stand out from the bow-spring and prevent the entrance of the folded glasses into their case. By the construction herein shown and described, I secure the independent action of the nose-guard springs and bow-spring and when the lenses are folded together in the form represented in Fig. 3 of the drawings, the nose-guard spring will present no obstacle to the entrance of the folded glasses within their case.

What I do claim, and desire to secure by Letters Patent, is—

The combination with the eye-wires, of a pair of eye-glasses, and a flexible bow-spring connecting said eye-wires, of a nose-guard spring attached to the outer side of said bow-spring, said nose-guard spring and said bow-spring being attached at, or near, their central sections and nose-guards attached to the free ends of said nose-guard spring, said bow-spring and said nose-guard spring being relatively offset, so as to bring said eye-wires and said nose-guards in different planes, substantially as described.

SYLVESTER EASTMAN.

Witnesses:
RUFUS B. FOWLER,
H. M. FOWLER.